United States Patent [19]
Waniczek et al.

[11] Patent Number: 4,522,965
[45] Date of Patent: Jun. 11, 1985

[54] THERMOPLASTIC CONTACT ADHESIVES CONTAINING EPOXIDE PLASTICIZERS

[75] Inventors: Helmut Waniczek, Cologne; Herbert Bartl, Odenthal; Gerhard Hohmann; Ludwig Mott, both of Leverkusen, all of Fed. Rep. of Germany

[73] Assignee: Bayer Aktiengesellschaft, Leverkusen, Fed. Rep. of Germany

[21] Appl. No.: 670,226

[22] Filed: Nov. 13, 1984

[30] Foreign Application Priority Data

Nov. 23, 1983 [DE] Fed. Rep. of Germany ....... 3342307

[51] Int. Cl.³ .............................. C09J 3/14; C09J 5/06
[52] U.S. Cl. .................................... 524/109; 524/114; 524/504
[58] Field of Search .................. 524/109, 504, 114

[56] References Cited

U.S. PATENT DOCUMENTS

| | | | |
|---|---|---|---|
| 3,911,053 | 10/1975 | Wiest et al. | 525/311 |
| 3,950,209 | 4/1976 | Kosaka et al. | 525/301 |
| 4,100,222 | 7/1978 | Iwamoto et al. | 525/63 |
| 4,284,341 | 8/1981 | Takeda et al. | 524/272 |
| 4,296,017 | 10/1981 | Weissgerber et al. | 524/311 |
| 4,434,261 | 2/1984 | Brugel et al. | 524/109 |

FOREIGN PATENT DOCUMENTS

| | | | |
|---|---|---|---|
| 663860 | 5/1963 | Canada | 524/109 |
| 5900 | 2/1970 | Japan | 524/109 |
| 7866 | 3/1970 | Japan | 524/109 |
| 907744 | 8/1974 | Japan | 524/109 |
| 82157 | 7/1975 | Japan | 524/109 |

*Primary Examiner*—Herbert J. Lilling
*Attorney, Agent, or Firm*—Connolly and Hutz

[57] ABSTRACT

The present invention relates to new thermoplastic contact adhesives. They have high heat resistance and bond strength.

4 Claims, No Drawings

THERMOPLASTIC CONTACT ADHESIVES CONTAINING EPOXIDE PLASTICIZERS

This invention relates to new thermoplastic contact adhesives which have high heat resistance and bond strength.

Thermoplastic contact adhesives are known to be prepared by the thermoplastic mixing of an elastomer component with an adhesifying resin and additives. The elastomer component used is in most cases a block copolymer, such as a styrene-isoprene-styrene or styrene butadiene-styrene block copolymer, which imparts good surface tack to the adhesive together with moderate heat resistance. One disadvantage of such contact adhesives is liable to be the poor age resistance, thereof which adversely affects the adhesives in application and in use.

When copolymers of ethylene and vinyl acetate are used as elastomer components for the production of thermoplastic contact adhesives, the products obtained are more age resistant than those mentioned above, but have a lower heat resistance.

Various methods have been proposed to improve the heat resistance of thermoplastic contact adhesives based on copolymers of ethylene and vinyl acetate. The addition of pyrogenic silicate fillers is described in DE-A No. 2,013,158. These fillers are said to improve the heat resistance of the adhesive compounds, but at the same time they are liable to alter the contact adhesive properties to such an extent that, when the adhesives are used for bonding joints, it may be necessary to activate them by heating. These adhesives are not self-adherent at room temperature.

Graft copolymers are described in DE-A No. 2,917,531 for the production of contact adhesive compounds. These adhesive compounds must be activated by heat to form the bond. If the bond is produced at room temperature, the resistance to peeling is reduced.

Graft polymers containing plasticizers have been described for use in contact adhesives in DE-A No. 2,903,687, but they do not contain plasticizers with epoxide groups.

The present invention relates to thermoplastic contact adhesives having high heat resistance and bond strength, containing:
(a) from 60 to 100 parts, by weight, of a graft copolymer having the composition: from 65 to 97% by weight, of graft base consisting of a copolymer of from 45 to 65%, by weight, of ethylene units and from 35 to 55%, by weight, of vinyl acetate units and optionally up to 10%, by weight, of units of other unsaturated compounds, and from 35 to 3%, by weight, of grafted monomer units consisting of from 80 to 100%, by weight, of methyl methacrylate units and from 0 to 20%, by weight, of units of other unsaturated compounds;
(b) from 3 to 50 parts, by weight, of a plasticizer containing epoxide groups or of a mixture of various plasticizers containing epoxide groups;
(c) 60 to 200 parts, by weight, of an adhesifying resin; and
(d) from 0 to 20 parts, by weight, of other additives, such as fillers, plasticizers, dyes stabilizers or polymers, such as block copolymers of styrene and butadiene or isoprene or ethyl vinyl acetate copolymers, polyisobutylene or atactic polypropylene.

Graft copolymers used for the purposes of the present invention are prepared in solution or solvent-free by known methods of polymerisation of methyl methacrylate or monomer mixtures consisting predominantly of methyl methacrylate, at least to an extent of 80%, by weight, in the presence of copolymers of from 45 to 65%, by weight, of ethylene units, from 35 to 55%, by weight, of vinyl acetate units and optionally up to 10%, by weight, of units of other unsaturated compounds, so that the graft polymers contain from 3 to 35%, by weight, of methyl methacrylate units.

Up to 50%, by weight, of the ethylene/vinyl acetate copolymers may be replaced by other polymers, e.g. by ethylene/acrylic acid ester copolymers, copolymers of ethylene and vinyl acetate containing up to 35%, by weight, of vinyl acetate units, or ethylene/propylene copolymers which may contain up to 5%, by weight, of unsaturated units, such as ethylidene norbornene.

A preferred method of preparing the graft copolymers to be used according to the present invention involves dissolving the copolymers in organic solvents, e.g. aromatic solvents, such as toluene, esters, such as ethyl acetate, or alcohols, such as t-butanol, in the presence of the monomer which is to be grafted, adding a radical former in quantities of from 0.2 to 5%, by weight, based on the monomer mixture, and carrying out the graft polymerisation at temperatures of from 0° to 180° C., preferably from 30° to 120° C. The graft polymer is subsequently freed from any excess monomer by evaporation of the solvents.

Radical-formers for the present purposes may be, for example, peroxides, azo compounds, oxygen, radiation (e.g. UV rays), radio waves or other radical-forming agents.

It is preferred to use organic peroxides, among which, for example, peroxodicarbonates and diacyl peroxides are particularly preferred (e.g. H. Elias, "Makromoleküle", publishers Hüthig and Wepf Verlag, Basle, 1972, page 478).

The graft polymers are tough, elastic compounds which are not tacky at room temperature. The contact adhesives which may be obtained by mixing these graft polymers with adhesifying resins in proportions, by weight, of from 1:0.5 to 1:3 are highly heat resistant, but do not have self-adherent characteristics at room temperature. Although the addition of plasticizers, such as phthalic acid esters or phosphoric acid esters, in quantities of from 5 to 30%, by weight, based on the sum of graft copolymer, resin and plasticizer, may render these compounds self-adherent at room temperature, the heat resistance thereof is reduced by the addition of such plasticizers.

It is surprisingly found that, when plasticizers containing epoxide groups are added in accordance with the present invention in quantities of from 1 to 30%, by weight, based on the sum of graft copolymer, resin and plasticizer, the sharp drop in heat resistance does not take place and compounds having good bonding properties are obtained.

The adhesifying resins used for the present purposes may be, for example, modified or unmodified colophony resins, such as colophony, hydrogenated colophony, or dimerised colophony or esters thereof with alcohols such as glycerol or pentaerythritol, and hydrocarbon resins, such as cumarone or indene resins.

Plasticizers containing epoxide groups are for the present purposes to be understood to include epoxidized esters of fatty acids or oleic acid with monohydric or higher hydric alcohols having from 1 to 12 carbon atoms.

It is preferred to use esters of epoxidized fatty or oleic acids with n- or iso-alcohols or triglycerides thereof.

The epoxidized esters of fatty or oleic acids to be used according to the present invention are in most cases derived from natural products and therefore cannot always be uniform in structure. They are usually prepared in known manner by the epoxidation of unsaturated fatty or oleic acid esters (e.g. E. Dachselt in "Plaste und Kautschuk", Year 10, No. 5/1963).

The following are examples of plasticizers with epoxide groups suitable for the purposes of the present invention: epoxidation products of naturally occurring oils, such as soya bean oil, ground nut oil, rape seed oil, sunflower oil, linseed oil, cotton seed oil, tall oil, sperm oil or fish oil, or pork lard, or the esters of epoxidized fatty acids with straight, branched, cycloaliphatic or araliphatic monohydric alcohols, such as methyl epoxy stearate, n- or iso-butyl epoxystearate or cyclohexyl-methyl epoxystearate.

The epoxide oxygen content of the epoxidized oils and epoxidized esters of fatty acids is generally from 1 to 10%, by weight. These products generally also contain olefinic groups of unreacted double bonds. Since the starting products are natural in origin, the plasticizers containing epoxide groups may contain mixtures of other compounds, such as saturated fatty acid esters. The viscosity of the epoxidized esters (mixtures) is generally from 100 to 5000 cP at 20° C.

Addition of the plasticizers containing epoxide groups to the mixtures of adhesive compounds according to the present invention is normally carried out by bringing the components together and mixing them at temperatures of from 100° to 250° C., preferably from 150° to 220° C.

According to a preferred emtodiment of the present invention, the plasticizer containing epoxide groups is added to the graft base of component (a) and the grafting reaction is then carried out.

According to another preferred embodiment, the plasticizer containing epoxide groups is added to the graft product after grafting has been carried out and before the product is worked-up. The adhesive raw materials obtained in both these embodiments need only be mixed with adhesifying resins and possibly additives.

The contact adhesives according to the present invention are tough, tacky masses which may be applied in the molten state to various materials, such as paper, plastics foils, metals or textiles, by the conventional devices, such as nozzles or roller applicators, and form a pressure-sensitive, self-adherent surface after application. They are distinguished by firm adherence and high heat resistance.

EXAMPLES (1) 200 g of an ethylene/vinyl acetate copolymer having a vinyl acetate content of 45%, by weight, and a melt index at 190° C. of 2–5 g/10 min. are dissolved in 1000 g of t-butanol at 70° C. with stirring. 50 g of methyl methacrylate and 1.4 g of dicyclohexyl peroxodicarbonate are then added and the reaction mixture is heated to 80° C. with stirring so that it refluxes. After 1 hour at 80° C., 2.9 g of 2,2'-methylene-bis-(4-methyl-6-t-butylphenol) are added and the mixture is cooled to room temperature.

The reaction mixture is then poured into a dish and dried to constant weight under vacuum (20 mbar) at 50° C. 250 g of a tough, rubbery elastic mass are left behind. This mass is then mixed with the plasticizers, a glyceric ester of hydrogenated colophony as adhesifying resin and stabilizers at 180° C. in the quantities indicated in the following Table 1 until a homogeneous melt is obtained.

(2) 200 g of an ethylene/vinyl acetate copolymer of 45%, by weight, of vinyl acetate units and 55% by weight, of ethylene units having a melt index according to DIN 53 735 of 9 g/10 min at 190° C. under a load of 2.16 kg are dissolved in 1000 g of t-butanol and 40.7 g of epoxidized soya bean oil with stirring at 70° C. 50 g of methyl methacrylate and 1.4 g of dicyclohexyl peroxodi carbonate are then added and the reaction mixture is refluxed at about 80° C. for 1 hour 2.9 g of 2,6-di-t-butyl-p-cresol are then added and the reaction mixture is evaporated to constant weight under a water jet vacuum at 50° C. The residue is homogenized with 250 g of a glyceric ester of hydrogenated colophony and 7 g of 2,2'-methylene-bis-(4-methyl-6-t-butyl phenol) at 180° C.

The product is tested as a thermoplastic contact adhesive (see Table 3.)

(3) Graft products are prepared by the method described in Example 1, but the methyl methacrylate used there is replaced by the monomers given in the following Table 2 in the quantities indicated there.

TABLE 1

| No. | Graft polymer Parts, by wt. | Resin[3] Parts, by wt. | Stabilizer Parts, by weight | Plasticizer Parts, by weight |
|---|---|---|---|---|
| (a) | 97 | 100 | 1.6 | 3 dioctyl adipate |
| (b) | 90 | 100 | " | 10 dioctyl adipate |
| (c) | 87 | 100 | " | 13 dioctyl adipate |
| (d) | 85 | 100 | " | 15 dioctyl adipate |
| (e) | 90 | 100 | " | 10 alkyl sulphonic acid ester of phenol |
| (f) | 85 | 100 | " | 15 alkyl sulphonic acid ester of phenol |
| (g) | 93 | 100 | " | 7 poly-1,6-butane diol adipate |
| (h) | 85 | 100 | " | 15 poly-1,6-butane diol adipate |
| (i) | 95 | 100 | " | 5 dioctyl phthalate |
| (j) | 90 | 100 | " | 10 dioctyl phthalate |
| (k) | 89 | 100 | " | 11 epoxidised soya bean oil |
| (l) | 86 | 100 | " | 14 epoxidised soya bean oil |
| (m) | 75 | 100 | " | 25 epoxidised soya bean oil |
| (n) | 86 | 100 | " | 14 i-butyl-epoxy-stearate |
| (o) | 86 | 100 | " | 14 epoxidized linseed oil |
| (p) | 86 | 100 | " | 14 n-butyl epoxystearate |
| (q) | 100 | 100 | " | ∅ |
| (r) | 100 | 150 | " | ∅ |
| (s) | 100 | 200 | " | ∅ |

TABLE 2

| No. | Monomer [g] |
|---|---|
| (A) | 50 g methyl methacrylate + 2 g methacrylic acid |
| (B) | 50 g methyl methacrylate + 2 g maleic acid anhydride |
| (C) | 50 g methyl methacrylate 100 g vinyl acetate |
| (D) | 50 g n-butyl acylate |

TABLE 2-continued

| No. | Monomer [g] |
|---|---|
| (E) | 50 g 2-ethyl-hexyl acrylate |

The individual graft products are homogenized with additives at 180° C. as indicated below:

| No. | Parts, by wt. of graft product | Resin(3) Parts, by wt. | Stabilizer(4) Parts, by weight | Plasticizer Parts, by weight |
|---|---|---|---|---|
| (u) | 80 (A) | 100 | 1.6 | 20 epoxidised soya bean oil |
| (v) | 80 (B) | 100 | 1.6 | 20 epoxidised soya bean oil |
| (w) | 85 (B) | 100 | 1.6 | 15 epoxidised soya bean oil |
| (x) | 95 (D) | 105 | 1.6 | |
| (y) | 95 (E) | 105 | 1.6 | |

The adhesive masses were applied at 180° C. by means of a wiper applicator to a 50μ thick polyethylene glycol terephthalate foil over a width of 200 mm and a length of 300 mm and in a thickness of 0.2 mm.

To test the peel strength, strips 300 mm in length and 15 mm in width were cut from the coated foils and carefully applied to a highly polished refined steel plate so that no bubbles formed, and pressed into position by means of an aluminium roller 3 kg in weight which was rolled twice over the strips.

After a storage time of 60 minutes and 30 days, respectively, the foils were peeled from the steel plate at a peeling angle of 180° C. at 23° C. and at a rate of 300 mm/min. The forces required to peel the strips from the plate are shown in the following Table 3.

To test the heat resistance, strips of the coated foil 20 mm in width were glued over a length of 10 mm in overlapped arrangement to the steel plate previously used to test the peel strength. After 60 minutes' storage, the metal ends of the bonds were fixed in a circulating air drying cupboard at 70° C. After a heating up period of 60 minutes, various weights were attached to the free ends of the foils and the time in minutes required for complete destruction of the bond was recorded. The results are shown in the following Table 3.

Thermoplastic adhesives z1 and z2 prepared as shown in Table 4 which are not according to the present invention were tested for comparison.

TABLE 3

| Thermoplastic adhesive | Peel strength (N/mm) at 23° C. immediate after 30 days | Heat resistance at 70° C. (min) under a load of | | | | |
|---|---|---|---|---|---|---|
| | | 50 g | 75 g | 100 g | 150 g | 200 g |
| a | 1.1 | 60 | 48 | | | |
| b | 1.1 | 60 | 41 | | | |
| c | 1.2 | 60 | 32 | | | |
| d | 1.1 | 60 | 33 | | | |
| e | 1.2 | 60 | 32 | | | |
| f | 1.3 | 60 | 35 | | | |
| g | 1.2 | 60 | 29 | | | |
| h | 1.3 | 44 | | | | |
| i | 1.2 | 60 | 42 | | | |
| j | 1.3 | 58 | 22 | | | |
| k | 1.4 | 60 | 60 | 60 | 32 | |
| l | 1.4 | 60 | 60 | 60 | 33 | |
| m | 1.2 | 60 | 60 | 60 | 34 | |
| n | 1.0 | 60 | 60 | 60 | 38 | |
| o | 1.1 | 60 | 60 | 60 | 60 | 31 |
| p | 1.0 | 60 | 60 | 60 | 60 | 30 |
| q | 0.8 | 60 | 60 | 60 | 60 | 20 |
| r | 0.9 | 60 | 60 | 60 | 60 | 14 |
| s | 0.9 | 60 | 60 | 60 | 60 | 14 |
| t | 1.4 | 60 | 60 | 60 | 60 | 30 |
| u | 1.1 | 60 | 48 | | | |
| v | 1.2 | 60 | 60 | 33 | | |
| w | 1.4 | 60 | 40 | | | |
| x | 1.4 | 40 | | | | |
| y | 0.9 | 52 | | | | |
| z1 | 1.2 | 20 | | | | |
| z2 | 1.8 | 60 | 44 | | | |

TABLE 4

| | z1 | z2 |
|---|---|---|
| Levapren 450(R) | 75 | — |
| Cariflex TR 1107(R) | — | 75 |
| Resin(3) | 75 | 75 |
| Age resistor(R) | 1.5 | 1.5 |

To prepare the thermoplastic adhesive, the resin was first melted at 180° C. in a melting vat and the polymer and age resistor were then incorporated. The melt was then homogenized with stirring.
(1) An ethylene/vinyl acetate copolymer of Bayer G, containing 65%, by weight, of ethylene units and 45% by weight, of vinyl acetate units and having a melt index of 2 to 5 g/10 min at 190° C. under a 2.16 kg load.
(2) Styrene/isoprene/styrene block copolymer of Shell
(3) Glyceric ester of hydrogenated colophony.
(4) 2,2'-methylene-bis-(4-methyl-t-butyl-phenol).
The melt indices were determined according to DIN 53 735.

We claim:
1. Thermoplastic contact adhesive, containing:
 (a) from 60 to 100 parts, by weight, of a graft copolymer composed of from 65 to 97%, by weight of graft base consisting of a copolymer of from 45 to 65% by weight, of ethylene units with from 35 to 55% by weight, of vinyl acetate units and optionally up to 10%, by weight, of units of other unsaturated compounds, and from 35 to 3% by weight of grafted monomer units, consisting of from 80 to 100% by weight, of methyl methacrylate units and from 0 to 20% by weight, of units of other unsaturated compounds;
 (b) from 3 to 50 parts, by weight, of a plasticizer containing epoxide groups or of a mixture of various plasticizers containing epoxide groups;
 (c) from 60 to 200 parts, by weight, of an adhesifying resin; and
 (d) from 0 to 20 parts, by weight, of other additives; characterized in that the plasticizers containing epoxide groups are epoxidized oils or epoxidized fatty acid esters of alcohols having from 1 to 12 carbon atoms.
2. Thermoplastic contact adhesives according to claim 1, characterised in that the graft copolymer (a) is prepared by graft copolymerization of predominantly methyl methacrylate on ethylene/vinyl acetate copolymers, solvent-free or in solution, in the presence or absence of plasticizers containing epoxide groups, at temperatures from 0° to 180° C.
3. Thermoplastic contact adhesives according to claim 1, characterised in that up to 50%, by weight, of the ethylene/vinyl acetate copolymers are replaced by other polymers.
4. Thermoplastic contact adhesives according to claim 1, characterised in that the plasticizers containing epoxide groups have an epoxide oxygen content of from 1 to 10%, by weight, and a viscosity at 20° C. of from 100 to 5000 cP.

* * * * *